M. ARITA.
KNIFE.
APPLICATION FILED APR. 14, 1914.

1,133,213.

Patented Mar. 23, 1915.

Inventor
Moto Arita.

Witnesses
By Victor J. Evans
Attorney

United States Patent Office.

MOTO ARITA, OF BOSTON, MASSACHUSETTS.

KNIFE.

1,133,213.

Specification of Letters Patent. Patented Mar. 23, 1915.

Application filed April 14, 1914. Serial No. 831,844.

*To all whom it may concern:*

Be it known that I, MOTO ARITA, a citizen of the United States, residing at Boston, in the county of Suffolk and State of Massachusetts, have invented new and useful Improvements in Knives, of which the following is a specification.

The invention relates to culinary utensils, and has for an object to provide a paring knife for use in effectively paring vegetables or fruits and whereby the peelings can be readily removed without taking off too much of the meat or substance of the vegetable or fruit.

The invention embodies, among other features, the provision of a paring knife whereby the thickness of the peeling can be gaged by the user and furthermore contemplates a device which is so arranged and constructed that there is less danger of the operator cutting himself than with the paring knives now generally used.

Figure 1:
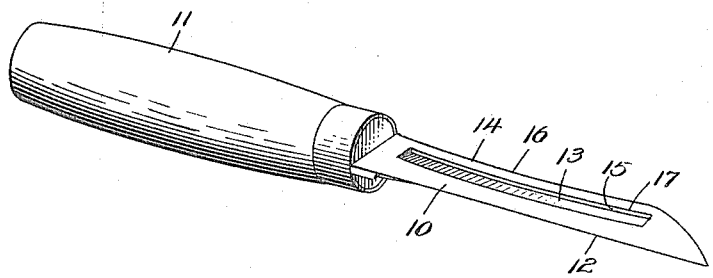
Figure 2:
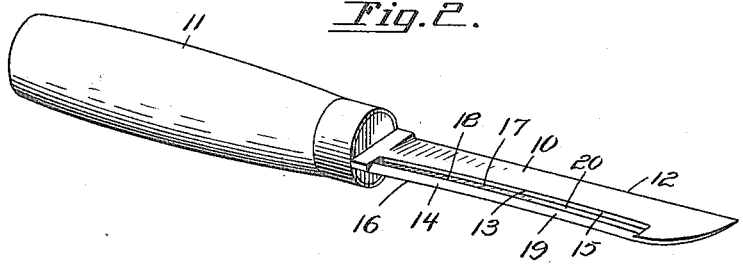
Figure 3:
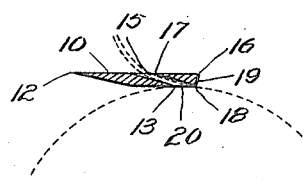

In the further disclosure of the invention reference is to be had to the accompanying drawings, constituting a part of this specification, in which similar characters of reference denote corresponding parts in all the views, and in which:

Figure 1 is a perspective view of the knife, looking at the upper face of the blade; Fig. 2 is a perspective view looking at the bottom face of the blade; and Fig. 3 is an enlarged transverse sectional view taken through the blade, with a peeling shown in dotted lines.

In paring knives now generally used it is impossible to commence cutting the peel to the desired thickness when the paring knife is initially placed upon the fruit or vegetable in view of the fact that the thickness or thinness of the peeling cannot be so regulated in the initial cut as to remove a peeling which will have a thickness equal to the width of the space between the guard and cutting edge of the blade. In my device I aim to employ a paring knife which has a fulcrum edge extending longitudinally adjacent the cutting edge of the blade, said fulcrum edge being formed on the guard and whereby the blade can be tilted or arranged at an angle with respect to the skin of the fruit or vegetable so that the initial peeling will be of the thickness desired and can be as thick as the distance between the guard and edge of the blade.

Referring now to the views, it will be seen that the blade 10 projects from a suitable handle 11 and includes a slicing edge 12, said blade having an opposed beveled cutting or paring edge 13 and which is curved as shown. Formed with the blade 10 is a guard 14 which has a portion thereof spaced from the blade to provide a slot 15, through which the peeling is adapted to pass when the knife is applied to a fruit or vegetable to pare the same. It should be particularly noted that the guard 14 in cross section provides a blunt edge 16 and which is the outer edge, an inner edge 17 and which is beveled, and a third edge 18 formed at the apices of the beveled portions 19 and 20 of the edges 16 and 17, said edge 18 constituting a fulcrum and extending longitudinally to the guard. Now it will be apparent that when the knife is applied to the rind or skin the fulcrum edge 18 will lie upon the surface so that the cutting edge 13 will dig down into the skin and upon pressure being exerted upon the handle a peeling will be removed and which will pass through the slot 15, the cutting width of the knife being controlled by the angularity of the cutting edge with respect to the peeling and the position of the fulcrum edge upon the surface of the rind so that upon tilting the blade forwardly or rearwardly the peeling can be increased or decreased in thickness to the convenience of the operator and it should be clearly noted that the bevel of the cutting edge is in a plane at right angles to the beveled portion 19 forming the edges 16 and 18, whereas the beveled portion 20 forming the edges 17 and 18 is substantially parallel to the beveled portion of the cutting or paring edge 13. Thus with a paring knife of the character described it will be seen that the thickness of the peeling can be varied to suit the user and there will be no danger of the operator cutting his hand in view of the provision of the guard 14 lying in front and above the cutting edge 13. It should also be noted that the slicing edge 12 is opposed to the cutting edge and when the blade is advanced over the fruit or vegetable so that the cutting edge will produce the peeling, the slicing edge 12 will not be in use, but will slide over the rind or part of the fruit or vegetable from which the peeling has been removed.

Having thus described my invention, I claim:

1. As a new article of manufacture, a paring knife comprising a straight blade, a handle for the blade, a beveled cutting edge on the blade, said cutting edge being curved relatively to the blade, and a guard on the blade and spaced from the cutting edge to provide a longitudinal slot, said guard being formed to provide an outer blunt beveled face, an inner beveled face and a fulcrum edge formed by the apices of the beveled portions of the outer and inner faces of the guard, with the said fulcrum edge lying in juxta position to the beveled cutting edge of the said blade.

2. As a new article of manufacture, a paring knife comprising a blade having a beveled cutting edge, and a guard for the blade, said guard being of a triangular shape in cross section to provide three faces, two of which are beveled and at their apices form a longitudinal fulcrum edge lying in juxta position to the inner extremity of the cutting edge of the blade.

In testimony whereof I affix my signature in presence of two witnesses.

MOTO ARITA.

Witnesses:
LEWIS Y. ETAW,
PHILIP T. NICKERSON.

Copies of this patent may be obtained for five cents each, by addressing the "Commissioner of Patents, Washington, D. C."